United States Patent [19]
Nagao

[11] 3,872,676
[45] Mar. 25, 1975

[54] SOIL PROTECTOR FROM SIPHON WATER

[76] Inventor: Tom Nagao, Rt. 2A, Box 214, Tremonton, Utah 84337

[22] Filed: Nov. 8, 1973

[21] Appl. No.: 414,125

[52] U.S. Cl. .............................. 61/12, 61/15, 404/2
[51] Int. Cl. .......................... E02b 7/00, E02b 9/04
[58] Field of Search .............. 61/12, 14, 15, 16, 10, 61/11, 13, 29; 52/16; 404/2

[56] References Cited
UNITED STATES PATENTS

| | | | |
|---|---|---|---|
| 494,455 | 3/1893 | Barkhaus, Jr. | 61/12 |
| 1,801,758 | 4/1931 | Sinclair | 61/12 |
| 2,334,779 | 11/1943 | Luff | 61/15 |
| 2,898,939 | 8/1959 | Fox | 61/12 |
| 3,636,830 | 1/1972 | Watts | 61/15 |

*Primary Examiner*—Jacob Shapiro

[57] ABSTRACT

A soil protector to prevent erosion of land in an irrigation ditch at the position in which water is injected into the irrigation ditch and including a unitary structure having an elongated bottom surface with a pair of opposed depending side wall surfaces and an end wall surface interconnecting the side wall surfaces at one end of the protector device and defining the water inlet end portion with the opposite end of the protector device being open and defining the water discharge end of the protector device, and a stake having one end connected to the open end edge of the bottom surface and projecting outwardly and downwardly therefrom adapted to engage the ground for anchoring the protector device in an irrigation trough such water discharged from a siphon tube having one end discharging water into the inlet end of the protector device is diffused in the protector device and flows smoothly out of the water discharge end thereof thus preventing a wearing or cutting away of the land adjacent the area where the water emerges from the siphon tube into the irrigation trough.

1 Claim, 4 Drawing Figures

PATENTED MAR 25 1975 3,872,676
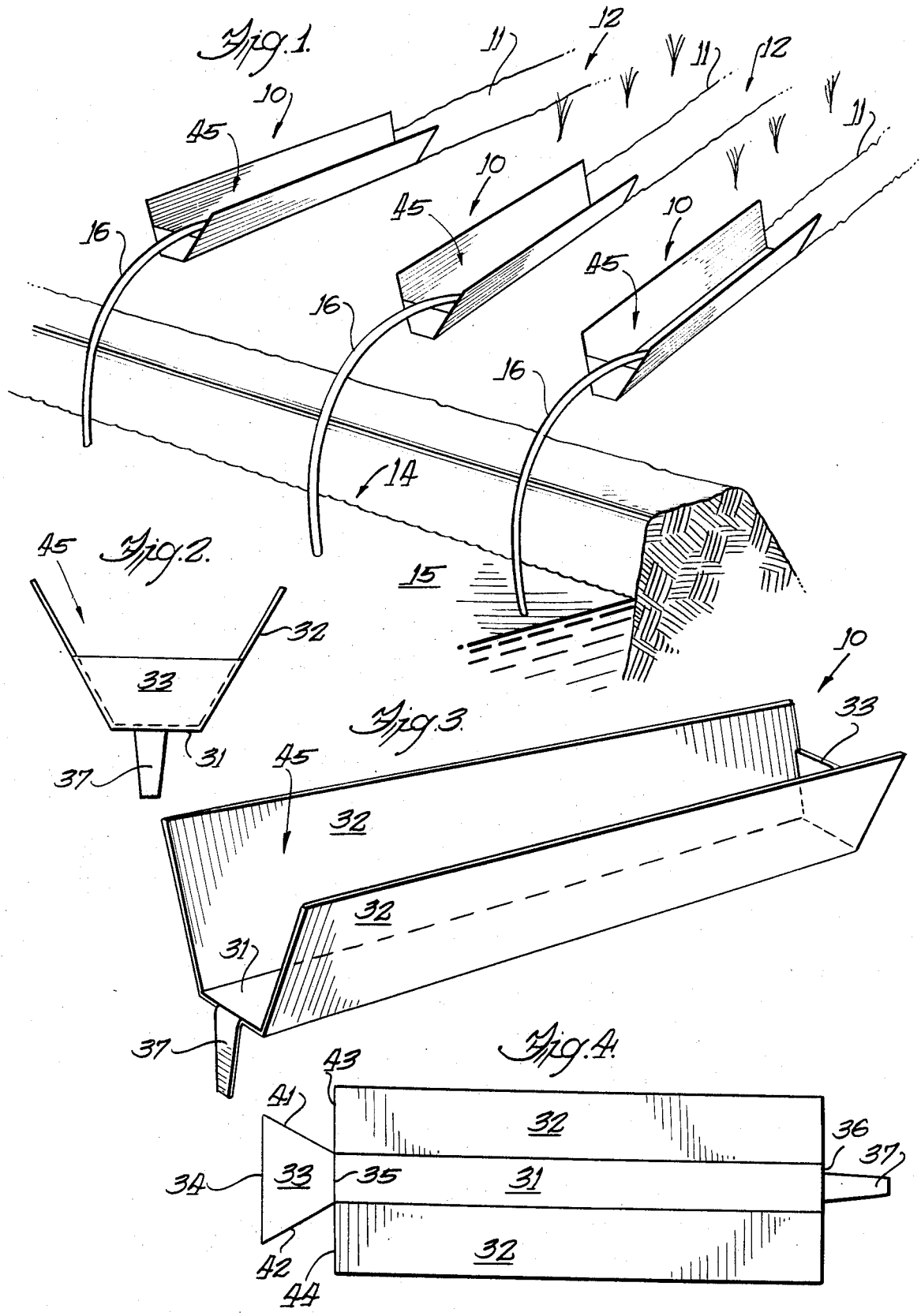

SOIL PROTECTOR FROM SIPHON WATER

BACKGROUND OF THE INVENTION

1. Field of the Invention

This invention relates generally to irrigation devices and more particularly to a novel protector device intended for use in an irrigation trough and adapted to protect the soil and land from erosion due to water delivered by a siphon into the trough for irrigation purposes. 2. Description of the Prior Art A popular and often used method of irrigation involves a main channel through which water is directed and which extends generally perpendicular to a series of irrigation troughs leading away from the channel to plants and the like to be irrigated, water being diverted from the main channel to the individual irrigation trough by individual siphon tubes in a known manner which have one end disposed in the main channel water with the opposite end disposed in the trough to be irrigated such that water flowing through the siphon is discharged directly into the trough. However, as is well known, it is required that such troughs be constantly repaired and earth reinstated thereto in view of the continuous flow over a small area of the ground of the trough causing a considerable wearing or cutting away of the earth in the form of land erosion. This erosion is a direct effect of the force of the water being discharged over a limited area of the trough.

SUMMARY OF THE INVENTION

The present invention recognizes the problem in delivering water to a trough from a main water carrying channel by use of siphon tubes and provides a novel solution thereof in the form of a soil protector device which provides a means for effectively breaking up and diffusing the stream of water emerging from the end of the siphon tube, such diffusing also serving to slow the flow of the water prior to it being delivered into the irrigation trough, it being obvious that a slower rate of flow along with a more divergent and diffused stream of flow will smoothly and evenly dissipate itself through the trough in a manner not carrying away part of the land surface or other materials which presently would cause land erosion such that no damage to the trough will take place thus eliminating the time and effort presently required in constantly rebuilding and reinstating troughs worn away by land erosion effects of the water delivered from siphon thereinto along the general area of such delivery.

It is a feature of the present invention to provide a soil protector in the form of a siphon water diverter device which is formed of a substantially unitary one-piece unit which is easily constructed, readily applied in a trough without requiring any special tools or expertise therefor, and which serves to deflect the rapid and hard flow of water discharging from a siphon tube into a smoother and more even flow of water which is discharged into the trough for irrigating the land.

Still a further feature of the present invention provides a soil protector from siphon water which is relatively simple in its construction and which therefore may be readily manufactured at a relatively low cost and by simple manufacturing methods; one which is devoid of moving parts and which therefore is unlikely to get out of order; one which is rugged and durable and which therefore may be guaranteed by the manufacturer to withstand many years of intended usage; one which is easy to use and efficient in operation; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same;

FIG. 1 is a perspective view of a plurality of soil protectors constructed in accordance with the present invention and illustrated in use in a plurality of irrigating troughs disposed adjacent a main channel and having siphon tubes associated therewith;

FIG. 2 is an end elevational view as viewed from the water inlet end of the soil protector device;

FIG. 3 is a perspective view of the soil protector device; and

FIG. 4 is a top plan view of a single blank of material prior to its being folded to define and form the soil protector device of the present invention.

DESCRIPTION OF THE PREFERRED EMBODIMENT

Referring now to the drawings in detail there is disclosed a preferred form of a soil protector device constructed in accordance with the principles of the present invention and designated in its entirely by the reference numeral 10, the same being disposed longitudinally in an irrigation trough 11 having plants 12 planted adjacent thereto, the irrigation trough extending perpendicular to a main channel 14 containing water 15 therein, the water being drawn from channel 14 into respective trough 11 by use of hollow elongated curved siphon tubes 16 each having one end disposed in the water 15 beneath the level of the top surface thereof with the opposite end disposed in protector device 10 such that water siphoned from channel 14 through siphon tube 16 is discharged into the protector device 10.

The soil protector device 10 may be manufactured out of metal, wood, hard rubber, plastic, or any other suitable satisfactory material, with the preferred embodiment being manufactured of essentially a single blank of sheet metal or similar material as shown in its unfolded position in FIG. 4. It is to be understood, however, that this is not intended to limit the present invention to such a blank as, for purposes of corrosion and rust resistance, a further preferable embodiment would be to manufacture the soil protector device 10 out of a suitable plastic material, such as polypropolene, polyethylene, and the like.

The sheet metal blank comprises an elongated rectangularly shaped flat bottom surface 31, a pair of side wall surface members 32 each extending along opposite side edges of the bottom surface 31 and projecting laterally outwardly therefrom, a truncated triangular end member 33 having the truncated apex portion thereof extending along one end of the bottom surface 31 with the sides thereof diverging outwardly therefrom and terminating in a base edge 34 of a greater length than the apex edge 35, and disposed on the opposite end 36 of bottom surface 31 and projecting outwardly therefrom is an anchor member 37.

As seen in FIG. 3, the side wall members 32 of the blank are adapted to be bent upwardly at an angle to the bottom surface 31 with the end wall 33 adapted to be bent upward at a ninety degree angle to the bottom surface 31 with the side edges 41 and 42 of the end member engaging the end edges 43 and 44 respectively of the side members 32 and being affixed thereto in a manner to define a trough like compartment 45 which is defined interiorly of the bottom surface, side wall members, and end member and wherein end member 33 defines the water inlet end portion of the trough compartment and with the opposite end of the trough compartment defining the water discharge end thereof. The stake 37 is adapted to be bent downwardly at approximately a ninety degree angle to the bottom surface 31 and is adapted to be engaged into the ground to anchor the device 10 firmly in an associated trough 11.

In operation, the discharge end of the associated siphon tube 16 is inserted into the trough compartment 45 adjacent the water inlet end 33 such that water discharged from the siphon tube is received in the trough compartment where it is diverted over a larger area and the flow of the water flowed such that a smooth, continuous and diverged stream of water will be discharged from the water discharge end of the trough compartment 45 into the associated trough 11 such that no land erosion or wear or tear of the soil adjacent the siphon tube or soil protector device 10 will occur. In this manner the respective troughs 11 will always remain in good condition without requiring constant repair or maintenance as now required when water is discharged directly from a siphon tube into a trough at the point of discharge from the siphon tube strikes the surrounding soil with a hard and continuous water flow effecting a wearing and cutting away of the soil adjacent the siphon tube and eventually destroying the portion of the trough abbout the area of the siphon tube.

It is to be understood that the form of this invention herewith shown and described is to be taken as a preferred example of the same, and that this invention is to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A soil protector device for protecting an irrigation trough and the like from siphon water directed thereinto from a siphon tube having one end of the tube disposed in a main water feed channel with the opposite end of the tube forming a water discharge end and adapted to discharge water into the irrigation trough, the protector device comprising, in combination:

a smooth elongated rectangularly shaped flat bottom surface member having an inlet edge, a discharge edge, and opposed longitudinally extending side edges;

a pair of flat longitudinally extending spaced apart side wall members, each side wall member associated with an opposite side edge of the bottom surface, each side wall member having a bottom edge and a top edge, each bottom edge of each side wall member completely extending along the associated side edge of the bottom surface and affixed thereto in a watertight manner, each side wall member extending upwardly and diverging outwardly from the interior surface of said bottom surface;

a flat inverted truncated triangularly shaped end wall member having the truncated apex edge thereof affixed to the inlet edge of the bottom surface with the end wall member projecting upwardly therefrom at about a ninety degree angle to said bottom surface, the end wall member having opposed outwardly diverging side wall edges adapted to engage the adjacent edge portions of the side wall members to thus define a closed water inlet end for the protector device;

the angle of divergence of the side edges of the end wall member being equal to the angle of divergence of the side wall members from the bottom surface such that the side edges of the end wall member are disposed inwardly of and adjacent the associated end edges of the side wall members;

the top edge of the end wall member terminating beneath the top edges of the side wall members to define an open topped tube receiving inlet and prevent backflow of the water from the irrigation ditch;

a flat rectangularly elongated anchor member having one end affixed centrally of the discharge edge of said bottom surface with the opposite edge projecting outwardly and downwardly therefrom at an angle of approximately ninety degrees relative to the bottom surface;

the bottom surface, side wall members, end wall member, and anchoring member all integrally formed relative to each other and manufactured of a unitary blank of sheet metal material having a uniform thickness throughout and then they are bent into their respective positions to define the protector device; and the protector device adapted to be longitudinally placed into an end of an irrigation ditch with the discharge end opening into the ditch and with said anchor inserted into the soil to positively secure the protector device in position.

* * * * *